US008903564B2

(12) United States Patent
Lee et al.

(10) Patent No.: US 8,903,564 B2
(45) Date of Patent: Dec. 2, 2014

(54) ELECTRIC DEVICE AND POWER MANAGEMENT APPARATUS FOR CHANGING DEMAND RESPONSE (DR) CONTROL LEVEL

(75) Inventors: Do Gwan Lee, Suwon-si (KR); Jin Chul Shin, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 762 days.

(21) Appl. No.: 13/090,708

(22) Filed: Apr. 20, 2011

(65) Prior Publication Data

US 2012/0209443 A1 Aug. 16, 2012

(30) Foreign Application Priority Data

Feb. 10, 2011 (KR) ........................ 10-2011-0012016

(51) Int. Cl.
*G05D 3/12* (2006.01)
*H02J 3/14* (2006.01)
(52) U.S. Cl.
CPC *H02J 3/14* (2013.01); *Y04S 20/244* (2013.01); *Y02B 70/3275* (2013.01); *Y02B 70/3216* (2013.01); *Y02B 70/3225* (2013.01); *Y04S 20/242* (2013.01); *Y04S 20/222* (2013.01); *Y02B 70/3266* (2013.01); *H02J 2003/146* (2013.01); *Y04S 20/221* (2013.01); *Y04S 20/224* (2013.01)
USPC .......................................... 700/295; 705/412
(58) Field of Classification Search
None
See application file for complete search history.

(56) References Cited

U.S. PATENT DOCUMENTS

| 5,867,162 | A | * | 2/1999 | O'Leary et al. | ............... | 715/843 |
| 6,181,985 | B1 | * | 1/2001 | O'Donnell et al. | ........... | 700/295 |
| 6,377,283 | B1 | | 4/2002 | Thomas | | |
| 6,587,739 | B1 | * | 7/2003 | Abrams et al. | .................. | 700/83 |
| 8,091,795 | B1 | * | 1/2012 | McLellan et al. | ............... | 236/51 |
| 8,285,419 | B2 | * | 10/2012 | Drew | ........................... | 700/276 |

(Continued)

FOREIGN PATENT DOCUMENTS

| WO | 02/17151 | 2/2002 |
| WO | 2009/085610 | 7/2009 |

OTHER PUBLICATIONS

International Search Report issued Feb. 8, 2012 in corresponding International Patent Application No. PCT/KR2012/000917.

(Continued)

*Primary Examiner* — Sean Shechtman
(74) *Attorney, Agent, or Firm* — Staas & Halsey LLP

(57) ABSTRACT

An electric device for changing a DR control level and a power management apparatus for the same are disclosed. An electric device for changing a demand response (DR) control level includes a memory unit to store a plurality of DR control levels classified according to power rates, a communication unit to receive a current power rate and a current power rate level related to the current power rate from a power provider in real time, a user interface which, upon receiving a request for changing a DR control level from a user, displays a list of pre-stored DR control levels and receives a DR control level to be changed from the user, and a controller to compare the current power rate level with the changed DR control level, and determine whether to perform a power saving operation. As a result, the electric device can decide whether to increase the usage of the electric device or to consider the power saving aspect using current power status information transmitted in real time, thereby adaptively adjusting a start level of the DR control.

18 Claims, 19 Drawing Sheets

(56) References Cited

U.S. PATENT DOCUMENTS

| | | |
|---|---|---|
| 2006/0259199 A1 | 11/2006 | Gjerde et al. |
| 2007/0183444 A1 | 8/2007 | Schoettle |
| 2009/0198384 A1 | 8/2009 | Ahn |
| 2009/0295594 A1 | 12/2009 | Yoon |
| 2010/0070101 A1 | 3/2010 | Benes et al. |
| 2010/0138363 A1 | 6/2010 | Batterberry et al. |

OTHER PUBLICATIONS

Extended European Search Report dated Jun. 22, 2012 issued in corresponding European Patent Application No. 11194222.3.

* cited by examiner

ELECTRIC DEVICE AND POWER MANAGEMENT APPARATUS FOR CHANGING DEMAND RESPONSE (DR) CONTROL LEVEL

CROSS-REFERENCE TO RELATED APPLICATIONS

This application claims the benefit of Korean Patent Application No. 10-2011-0012016, filed on Feb. 10, 2011 in the Korean Intellectual Property Office, the disclosure of which is incorporated herein by reference.

BACKGROUND

1. Field

Embodiments of the disclosure relate to an electric device for changing a demand response (DR) control level so as to adjust power consumption, and a power management apparatus for controlling the same.

2. Description of the Related Art

With the development of Information Technology (IT), the number of household appliances powered by electricity is rapidly increasing, in turn leading to increased power consumption. In order to satisfy such increased power demand, the number of power plants is rapidly increasing. However, as can be seen from a power demand pattern, peak capacity is not reached during most days of the year, that is to say, power plants only operate at full capacity during a few days out of the year.

A state in which a high power demand is required for a short time is called peak load. Construction costs for adding an additional power plant to the grid are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. For example, the consumer may temporarily stop operating an air-conditioner so as to reduce power consumption when power rates are high.

By means of the DR, a power-supply source can alter end user power consumption to achieve load balancing and can restrict end user power consumption to periods when demand is low, thereby reducing the user's overall energy expenditure.

Therefore, an electric device to which demand response (DR) is applied has been developed. The electric device receives real-time power rate information from the power-supply source or the power provider, and is turned on or off in response to the received power rate information.

Meanwhile, since the conventional power management system is unable to change or establish a DR control level acting as a start level of DR control, power saving control is achieved only at a predetermined price level, and it is impossible for the conventional power management system to perform the power saving control at another price level. In other words, the conventional power management system can control the DR when the power price reaches a predetermined power price level.

Therefore, the conventional power management system can only provide the current power price level information, and does not provide information regarding a DR control level at which power saving control starts operation. In addition, although each electric device is designed to perform DR control at different price levels not predetermined price levels appropriate for individual electric devices, the conventional power management system is unable to change a DR control level predetermined when the product is manufactured. As a result, although a user desires to normally operate the electric device, the user is unable to normally operate the electric device, resulting in inconvenience.

SUMMARY

Therefore, it is an aspect of the embodiment to provide an electric device for changing a DR control level indicating a start level of the power saving operation.

It is an aspect of the embodiment to provide an electric device for changing a demand response (DR) control level, including: a memory unit to store a plurality of DR control levels classified according to power rates; a communication unit to receive a current power rate and a current power rate level related to the current power rate from a power provider; and a controller to compare the current power rate level with a desired DR control level from the plurality of DR control level, and determine whether to perform a power saving operation.

It is another aspect of the embodiment to provide a power management apparatus which establishes a DR control level indicating a start level of the power saving operation of all the electric devices installed in a home, and changes the DR control level, resulting in the implementation of overall power management.

Additional aspects of the embodiment will be set forth in part in the description which follows and, in part, will be obvious from the description, or may be learned by practice of the invention.

In accordance with one aspect of the embodiment, an electric device for changing a demand response (DR) control level includes a memory unit to store a plurality of DR control levels classified according to power rates; a communication unit to receive a current power rate and a current power rate level related to the current power rate from a power provider in real time; a user interface which, upon receiving a request for changing a DR control level from a user, displays a list of pre-stored DR control levels and receives a DR control level to be changed from the user; and a controller to compare the current power rate level with the changed DR control level, and determine whether to perform a power saving operation.

The controller may set a product recommended DR control level pre-stored in the memory unit when the product is manufactured to a start level of the power saving operation, and set the changed DR control level to a start level of the power saving operation upon receiving a request for changing the DR control level from the user interface.

The controller, if the current power rate level is equal to or higher than the DR control level, may decide to perform the power saving operation.

The user interface may display the currently established DR control level for a predetermined period of time starting from when the electric device is powered on.

The user interface may display a menu for changing the DR control level, display the DR control level list if the user selects a menu for changing the DR control level, and receive a DR control level to be changed from among the DR control level list from the user.

The product recommended DR control level information may be received through the communication unit.

The user interface may display the current power rate level received from the communication unit and the product recommended DR control level, and provide the user with information of the electric device.

In accordance with another aspect of the embodiment, a power management apparatus for changing a demand response (DR) control level includes a communication unit to receive a current power rate and a current power rate level related to the current power rate from a smartmeter in real time, and receive information from a plurality of electric devices installed in a home; a memory unit to store the received current power rate, the received current power rate level, and information of the electric devices, and a plurality of DR control levels classified according to individual power rates; a user interface which, upon receiving a request for changing a DR control level of at least one electric device from a user, displays a list of pre-stored DR control levels and receives a DR control level to be changed from the user; and a controller to compare the current power rate level with the changed DR control level, and determine whether to perform a power saving operation.

The user interface may receive a request for changing the DR control level for each electric device, and receive a request for changing a DR control level of each of the electric devices.

The user interface, if the DR control level for each electric device is changed, may display a list of electric devices installed in a home, allow the user to select an electric device having a DR control level to be changed from among the displayed list of electric devices, display the DR control level list of the selected electric device and receive information regarding the DR control level to be changed from the user.

The user interface, if the user selects the electric device, may display the corresponding electric device information received through the communication unit.

The electric device information may include not only DR control level information currently established in the corresponding electric device, but also product recommended DR control level information pre-stored when the corresponding electric device is manufactured.

The user interface may receive information regarding the DR control level change in association with a plurality of electric devices installed in home, and receive a request for changing the DR control level in association with at least one group including at least one electric device from among the plurality of electric devices.

The controller may determine whether there is an electric device, a currently established DR control level of which is equal to or less than the current power rate level, and control the corresponding electric device to perform the power saving operation.

The memory unit may configure the electric device list on the basis of information received from the plurality of electric devices, and store the configured electric device list, and store electric device information corresponding to the list of electric devices.

The communication unit may periodically receive information regarding several electric devices installed in a home.

The controller may compare the pre-stored electric device list with the periodically received electric device information, and update the electric device list according to the result of comparison.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
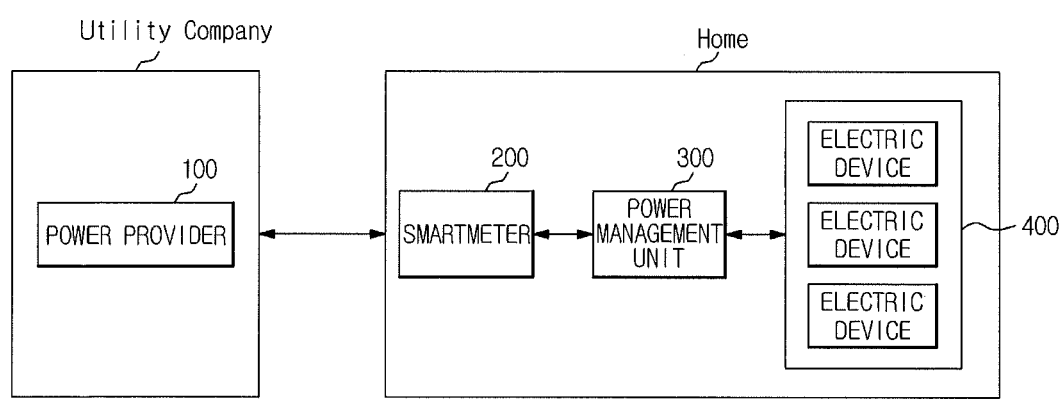
FIG. 1 illustrates a power management system according to an embodiment.

Reference will now be made in detail to the embodiments, examples of which are illustrated in the accompanying drawings, wherein like reference numerals refer to like elements throughout. An electric device for changing a DR control level and a power management apparatus for controlling the same will hereinafter be described with reference to the accompanying drawings.

FIG. 1 illustrates a power management system according to an embodiment.

Referring to FIG. 1, a power management system may include a power provider 100, a smartmeter 200, a power management unit 300, and an electric device 400.

The power provider 100 is a power supply source that is operated by a power supply company (utility company) which generates and supplies power. The power provider 100 generates the power through atomic energy, hydroelectric power, geothermal power, wind power, etc., and provides the generated power to electric devices 400 installed in each home.

In this case, in relation to the power provided to the electric devices installed in homes, a predetermined amount of power is generated each hour such that the generated amount of power is provided to each home. In contrast, different amounts of power are consumed in each home according to individual periods. For example, power consumption of each home during a dawn or morning period is less than that during another period such as the afternoon or dusk. In addition, power consumption of each home in spring or autumn is less than that in summer or winter.

Therefore, the power provider 100 determines the power rate of a period of low power consumption to be less than that of a high power consumption period, determines the power rate of a season of low power consumption to be less than a high power consumption season, and provides power of the determined power rate to each home.

The power provider 100 elastically adjusts power rates of each home in response to power consumption of each home, and provides the adjusted power to each home, such that demand can be balanced.

That is, the power provider 100 predicts power consumption on the basis of the generation amount of electric power, the past power consumption information for every season and every period, and weather information, and determines power rates on the basis of the predicted power consumption.

In addition, the power provider 100 may establish a power rate level where the power rate can be classified according to a predetermined reference.

The power provider 100 collects power consumption amounts of individual homes classified according to individual power rates, and stores the collected power consumption information according to individual power rates, such that the power-supply company calculates power rates (electricity bills or electric bills) depending upon power consumption for individual power rate levels of each home per month, and charges each home the calculated electric bills on a monthly basis.

The power provider 100 compares the periodically calculated monthly power rate (monthly bills) with monthly predetermined power rates to decide power bills. If the calculated monthly power rates are higher than the monthly predetermined power rates, information about the excess of the monthly predetermined power rates is transmitted to the power management unit 300 installed in the corresponding home, such that an event indicating the excess of monthly predetermined power rates is generated through the power management unit 300 installed in each home.

The power provider 100 stores a threshold power amount for each home, compares power consumption amount for each home with a threshold power amount, and thus decides a power limit.

In this way, the power provider 100 manages the power demand of each home on the basis of the threshold power amount or the monthly predetermined power rates.

In this case, the threshold power amount for limiting the power supply of each home may be arbitrarily determined by the power supply company, or may be determined by agreement with the power supply company for each home. In addition, the monthly predetermined power rates of each home are determined by agreement with the power supply company.

The power provider 100 stores and manages information about the excess of a threshold power amount for each consumer, power consumption state information about the excess of the monthly predetermined power rates, and the like.

The power provider 100 is connected to the smartmeter 200 installed in (or outside of) each home, the power management unit 300, and each electric device 400 over a network, such that information regarding power demand management can be transmitted and received over the network. This network may be any of a wired network, a wireless network, a wired/wireless hybrid network, etc.

The smartmeter 200 is installed in (or outside of) each home, and includes a display such as a liquid crystal display (LCD), such that power consumed by the home is displayed in real time.

The smartmeter 200 may be an electronic meter, which bidirectionally communicates with the power provider 100 and transmits the consumed power amount to the power provider 100 and the power management unit 300.

The smartmeter 200 receives power rate information from the power provider 100, displays the received power rate information, and transmits the power rate information to the power management unit 300.

In addition, the smartmeter 200 may further display a power rate level corresponding to the power rate information upon receiving the power rate information from the power provider 100.

In this case, the number of the power rate levels may be 5 (RTP1 to RTP5), and a plurality of levels may have different power rates and different allowed instantaneous powers. Let us assume that the number of power rate levels is 5 (RTP1 to RTP5). In more detail, the power rate level RTP1 is the lowest power rate level, and the power rate level RTP5 is the highest power rate level. Power rate level is proportional to power rate.

In this case, it is possible for the smartmeter 200 to transmit both the power rate information and the power rate level information to the power management unit 300 upon receiving both the power rate information and the rate level information from the power provider 100.

The power management unit 300 may also be referred to as a Demand Response (DR) controller.

The power management unit 300 communicates with the smartmeter 200, and thus receives a power rate and a power rate level corresponding to the power rate from the smartmeter 200. In addition, the power management unit 300 communicates with the electric device 400 to receive information of the electric device 400, and controls the operation of the electric device 400 on the basis of the power rate received from the smartmeter 200 and power information received from the electric device 400.

If the power provider 100 transmits power rate level information corresponding to power rate information, the power management unit 300 may also receive power rate level information as necessary.

In addition, the power management unit 300 may also establish a power rate level on the basis of power rates upon receiving the power rates from the power provider 100.

In this case, the power management unit 300 receives power rate information through the smartmeter 200 at intervals of a unit time, and establishes a power rate level of the received power rate on the basis of a predetermined reference.

The power management unit 300 receives information about excess threshold power and information about excess monthly predetermined power rates from the power provider 100, and informs the user of the received information.

The electric device 400 may be any one of a television, a washing machine, a dryer, a vacuum cleaner, an air-conditioner, a stove, an electric oven, a refrigerator, etc. However, it is not limited thereto. The electric device 400 communicates with a user interface 430 through which the user can input commands. If current time reaches a predetermined reservation time, the electric device 400 transmits information about the reservation time to the power management unit 300. The electric device 400 is driven in response to the driving command of the power management unit 300, the power consumed for driving the electric device 400 is metered and information about the metered power is transmitted to the power management unit 300.

An embodiment provides an electric device and a power management unit that provide a user with current DR control level information at which the power saving control starts, receive a request for changing the DR control level information from the user, and perform DR control, and a method for controlling the electric device and the power management unit.

Figure 2:
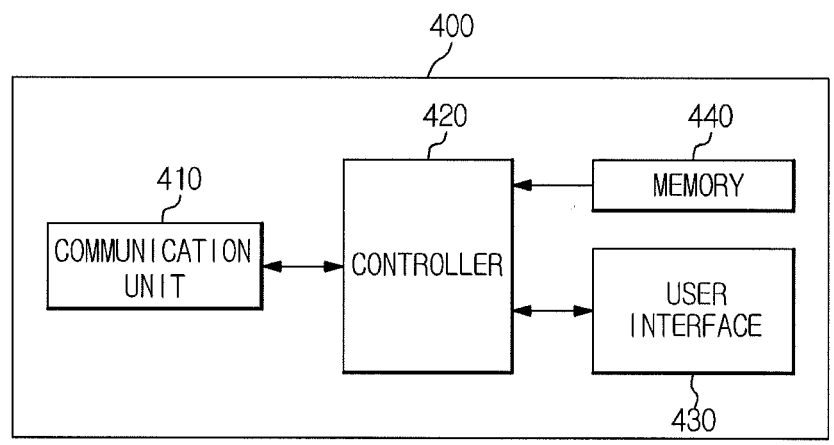
FIG. 2 illustrates an electric device according to an embodiment.

FIG. 2 is a detailed block diagram illustrating an electric device according to one embodiment.

Referring to FIG. 2, the user may change a current level to a desired DR control level for each electric device. The electric device 400 may include a communication unit 410, a controller 420, a user interface 430, and a memory unit 440.

The communication unit 410 communicates with the power management unit 300, receives power rates and divided power rate level information for each power rate, and transmits the received power rates and power rate level information to the controller 420.

The communication unit 410 may (periodically or based on a user's request) communicate with the power management unit 300, such that the communication unit 410 receives the current power rate and power rate level information corresponding to the current power rate.

In this case, the power rate level according to the embodiment may be divided into 5 levels (RTP 1 to RTP5) on the basis of a predetermined reference according to the power rate. However, it is not limited thereto. The power rate is sequentially increased in the order of RTP1→RTP2→RTP3→RTP4→RTP5.

Such a power rate level may be changed according to the policy of the power provider, and the communication unit 410 receives the changed power rate level information and stores the received information in the memory unit 440.

In addition, if a product recommended DR control level corresponding to a reference supplied from the manufacturing company is not pre-stored in the memory unit 440, the communication unit 410 receives the product recommended DR control level. In more detail, the communication unit 410 gains access to the server of the manufacturing company through a wired network or a wireless network so that it can receive the above-mentioned product recommended DR control level as an input.

The received product recommended DR control level information is stored in the memory unit 440 and is set to an initial DR control level for driving the product.

The controller 420 receives the power rate level information from the communication unit 410, configures a plurality of rate levels corresponding to a plurality of power rates in a form of the list of the DR control level where the power saving operation is started, and stores the configured list in the memory unit 440.

The controller 420 compares the power rate level received from the communication unit 410 with a currently established DR control level, and determines whether to perform the power saving operation according to the result of comparison. In more detail, the controller 420 decides to perform the power saving operation when the power rate level is equal to or higher than the currently established DR control level.

In addition, upon receiving a request for changing the DR control level to a desired DR control level from the user interface 430, the controller 420 stores the desired DR control level in the memory unit 440, and sets the stored DR control level to a start level of the power saving operation.

The user interface 430 may be implemented as a display such as a liquid crystal display (LCD), such that a data input part and a data output part may be integrated into one unit (for example, a touch screen) or may also be separated from each other as necessary. Alternatively, a button is implemented on one part of the display, such that the data input part and the data output part can be separated from each other in the user interface 430.

The user interface 430 receives an indication signal corresponding to the user's indication, outputs various information corresponding to an indication message of the controller, and informs the user of the various information.

Figure 3:
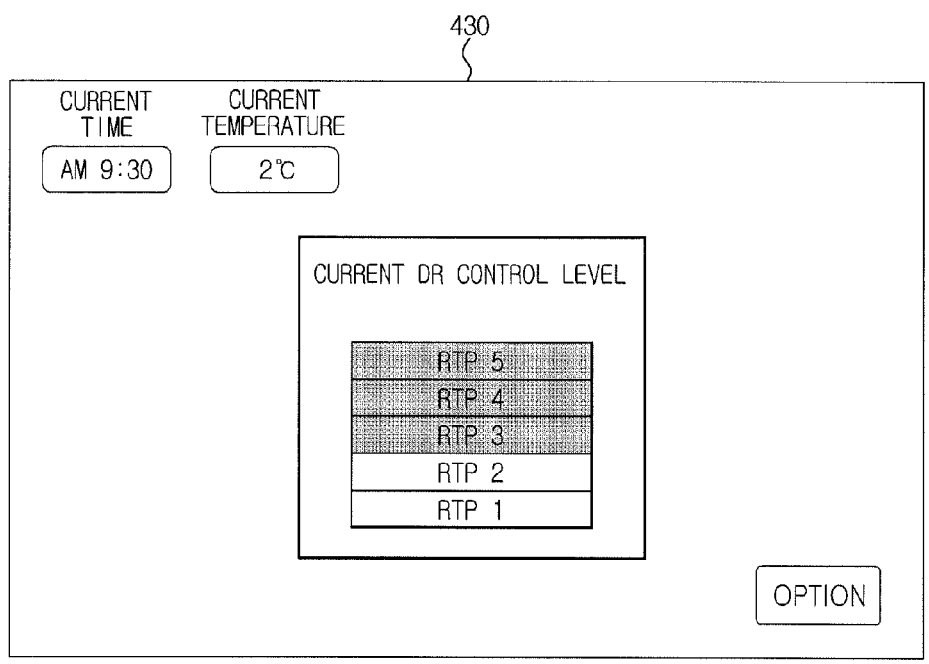
FIG. 3 exemplarily shows a screen image of a user interface of the electric device shown in FIG. 2.

FIG. 3 exemplarily shows a screen image of a user interface of the electric device shown in FIG. 2. Referring to FIG. 3, the user interface 430 may display a currently established DR control level for a few seconds when the electric device is powered on, or may continuously display such a currently established DR control level on one part of the electric device.

Referring to FIG. 3, the user interface 430 displays the list of DR control levels arranged in ascending numerical order of power rates. That is, RTP1 corresponding to the lowest power rate level is located at the bottom part and RTP5 corresponding to the highest power rate level is located at the highest part. However, it is not limited thereto.

In addition, the user interface 430 displays a currently established DR control level on the list of displayed DR control levels. That is, as the DR control level moves from a lower part to an upper part in the screen image of FIG. 3, it can be recognized that the power saving operation is performed in descending numerical order of power rates.

The current DR control level according to the embodiment is displayed in different lights and shades on the list of DR control levels such that the user can easily recognize the current DR control level. Such a current DR control level may be displayed in different colors, or may be displayed as an emoticon located at one part of the DR control level list.

In this way, if the current DR control level is displayed for a predetermined period of time, the user interface may receive a request for changing the DR control level from the user.

Figure 4A:
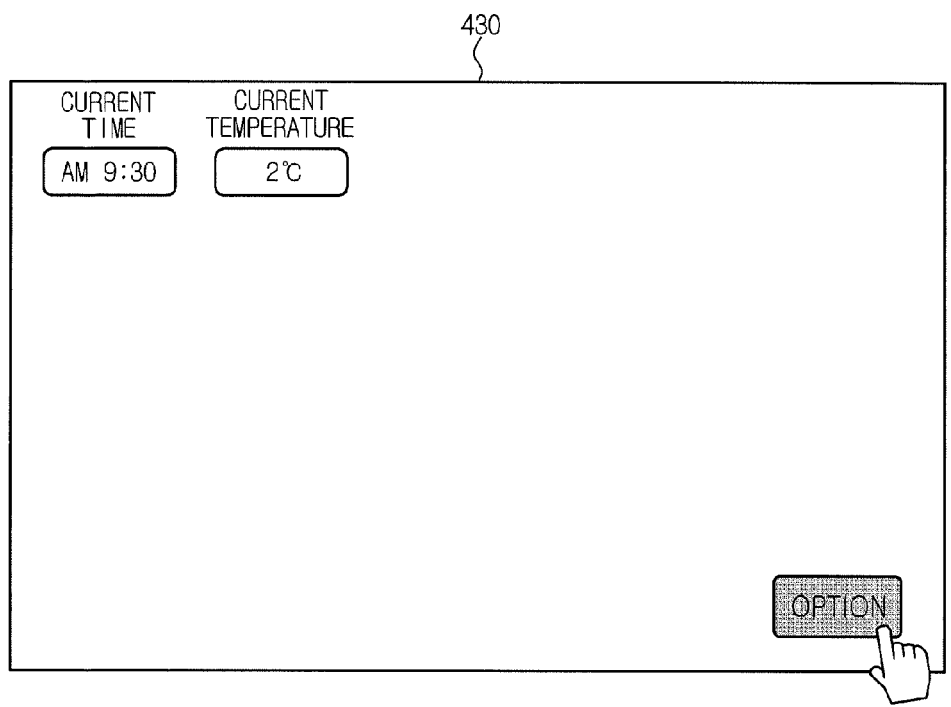
FIG. 4A exemplarily shows a screen image of a user interface for controlling a DR control level.
Figure 4B:
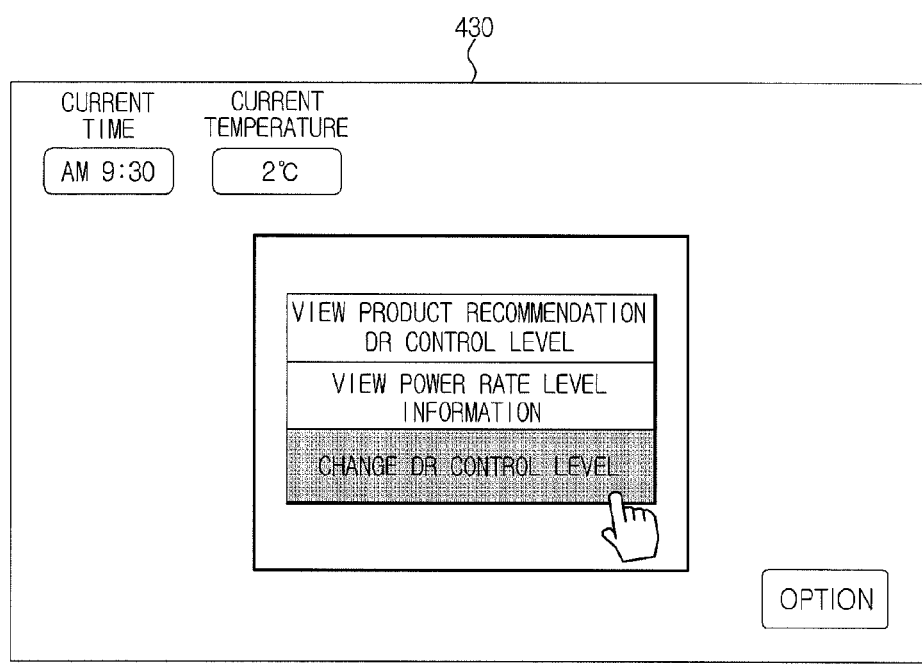
FIG. 4B exemplarily shows a screen image of a user interface for controlling a DR control level.
Figure 4C:
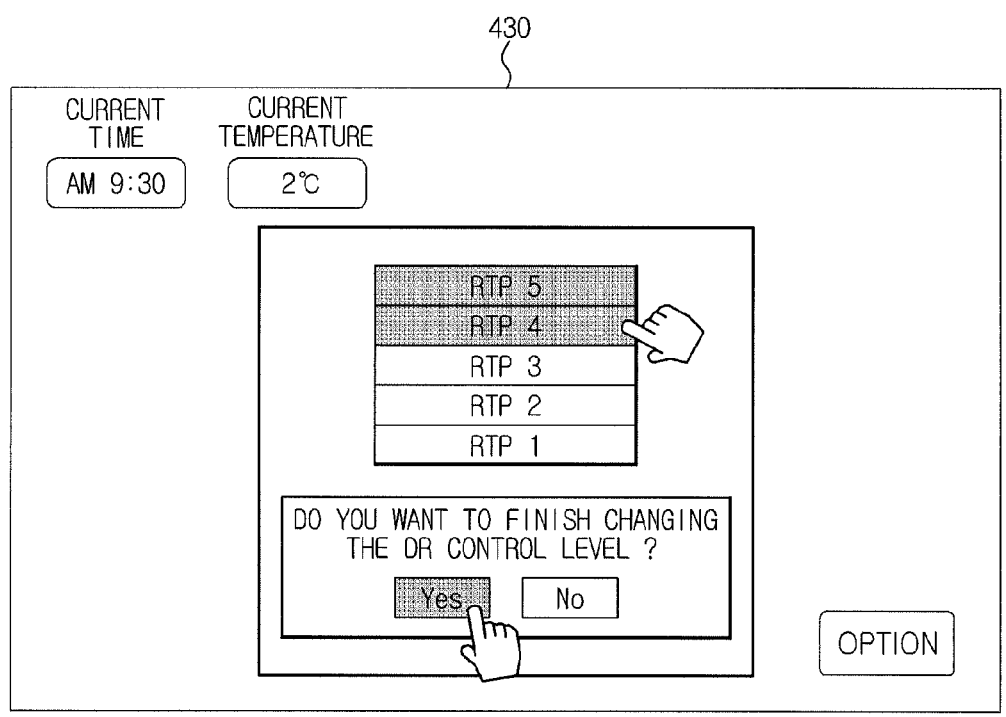
FIG. 4C exemplarily shows a screen image of a user interface for controlling a DR control level.

FIGS. 4A, 4B and 4C show exemplary screen images illustrating that the DR control level is changed by the user interface 430 of a refrigerator serving as an electric device.

Referring to FIGS. 4A and 4B, the user interface 430 displays current time, control information such as a current refrigerator control temperature, and an option menu.

If the user selects the option menu, a first menu window for providing the product recommended DR control level information and the current power rate level information, and a second menu window for changing a DR control level are displayed.

If the user selects the second menu window for changing a DR control level, the list of DR control levels is displayed such that a DR control level to be changed can be selected as shown in FIG. 4C.

Upon receiving a DR control level to be changed from among the DR control level list from the user, a dialogue window "Do you want to finish changing the DR control level ?" is displayed. If "Yes" is selected by the user, changing of the DR control level is completed.

The changed DR control level is stored in the memory unit 440 by the controller 420. During the next DR control, the changed DR control level is used.

Figure 5:
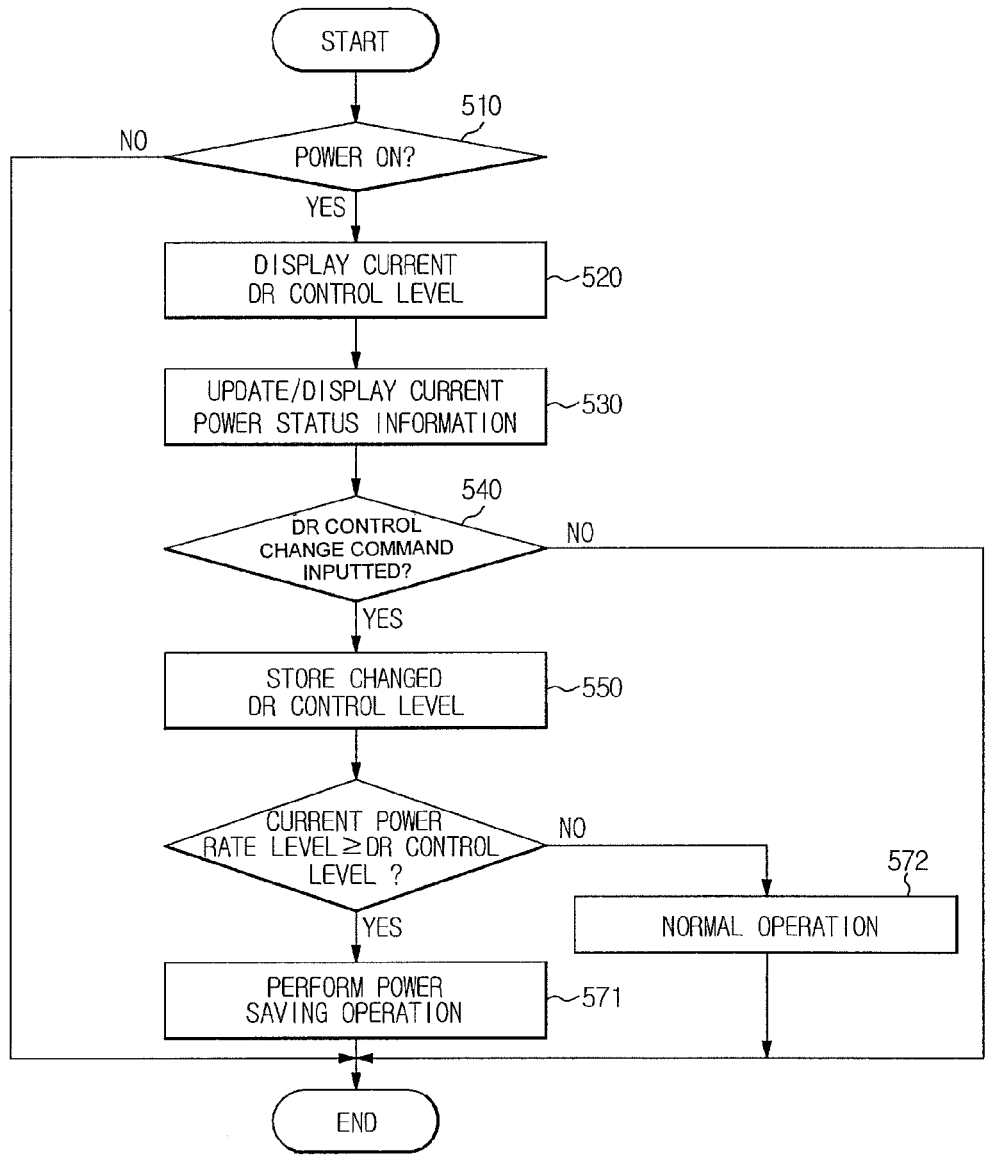
FIG. 5 illustrates a method for controlling an electric device according to an embodiment.

FIG. 5 illustrates a method for controlling an electric device according to another embodiment.

Referring to FIG. 5, if the electric device is powered on (Operation 510), currently established DR control level information is displayed on the user interface for a predetermined period of time (Operation 520).

The current DR control level information may be displayed for a few seconds as soon as the electric device is powered on, or may be continuously displayed at one part of the user interface, or may be displayed by the user's request.

Meanwhile, the currently established DR control level information may be product recommended DR control level information predetermined by the product manufacturing company, or may be a DR control level established by the user when the electric device is powered on.

Meanwhile, the product recommended DR control level may be pre-stored in the memory unit 410 when the product is manufactured. If the product recommended DR control level is not pre-stored in the memory unit 440, the electric device may access the manufacturing company server through the communication unit 410 so as to directly receive the product recommended DR control level information, and store the received information in the memory unit 440.

If the current DR control level is displayed in operation 520, the controller 420 transmits a control signal to the communication unit such that it receives current power rate information and power rate level information corresponding to the power rate (Operation 530).

The current power status information may be updated through the communication unit 410 at intervals of a predetermined time, and the received current power status information is stored in the memory unit 440. It is also understood that the power status information may be updated when the power status information is changed.

Meanwhile, although the power rate level information according to the embodiment may be divided into 5 levels (RTP1 to RTP5), the number of power rate levels may be changed according to the policy of the power providing company, and the changed power rate level may be transmitted through the communication unit 410 and be updated in the memory unit 440.

The user may recognize the current power status information and the product recommended DR control level information that are stored in the memory unit 440 through the user interface, such that the user may change the DR control level in consideration of the utility or power saving aspect of the electric device 400 on the basis of the recognized information.

In more detail, in order to increase the utility of the electric device, a DR control level is adjusted to be higher than the currently established DR control level, such that the power saving control is performed from a specific time point where the power rate becomes relatively expensive. In addition, in order to increase the power saving aspect of the electric device, the DR control level is adjusted to be less than the current DR control level, such that the time for which the power saving control is executed is relatively increased.

If the DR control level change is selected by the user (Operation 540), the controller stores the changed DR control level in the memory unit 440 and updates the current DR control level information (Operation 550). Then, the controller 420 determines whether to perform the power saving control on the basis of the current DR control level and the current power status information (Operations 560, 571 and 572).

In more detail, if the power rate level corresponding to the current power rate is equal to or higher than the current DR control level (Operation 560), the controller performs the power saving control (Operation 571). Otherwise, the controller 420 controls the normal driving operation (Operation 572).

As a result, the user determines whether to increase the utility of the electric device or to consider the power saving aspect using the current power status information transmitted in realtime, such that the user can adaptively adjust the start level of DR control. Therefore, the embodiment can solve the problem that the related art is unable to perform the normal operation desired by the user.

As described above, although a DR control level is adjusted for each electric device installed in each home, an electric device having no separate user interface may be present as necessary, or it is necessary to manage a DR control level in conjunction with a plurality of electric devices.

A power management unit to control the entire DR control level of all the electric devices installed in each home and a method to control the power management unit will hereinafter be described in detail.

Figure 6:
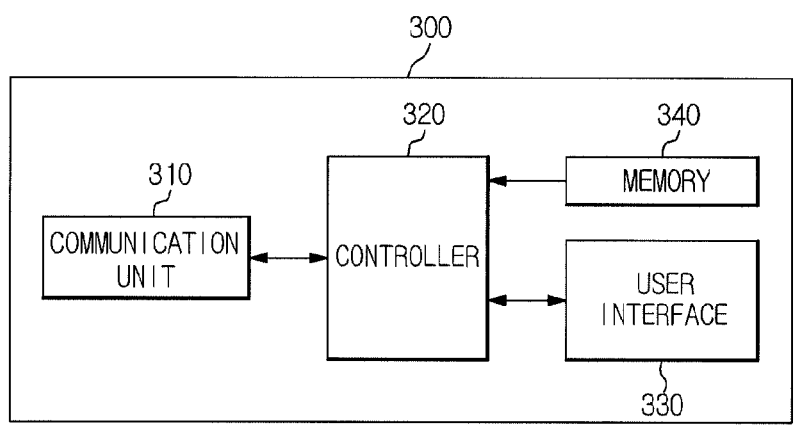
FIG. 6 illustrates a power management unit according to another embodiment.

Referring to FIG. 6, the power management unit 300 includes a communication unit 310, a controller 320, a user interface 330, and a memory unit 340.

The communication unit 310 communicates with the smartmeter 200, receives the power rate and the power rate level information corresponding to the power rate from the smartmeter 200, and transmits the received information to the controller 320. The communication unit 310 communicates with the electric device 400, receives information regarding the electric device, transmits the received information to the controller 320, receives the driving control signal of the electric device 400 from the controller 320, and transmits the received driving control signal to the electric device 400.

In this case, the electric device information may include a device name, power information, product recommended DR control level information predetermined when the device is manufactured, and the like. The electric device information is stored in the memory unit 340. In this case, the power information may include average power consumption, average operation time information, etc.

In addition, the communication unit 310 may periodically receive information about the electric device installed in a home, and updates the electric device information stored in the memory unit 340.

In more detail, the communication unit 310 receives information regarding the electric device newly installed in a home, and stores the received information in the memory unit 340. In addition, the communication unit 310 transmits the received electric device information to the controller 320, such that information regarding the electric device uninstalled in each home can be deleted from the memory unit 340.

The controller 320 compares the power rate level information received from the communication unit 310 with a DR control level established for each electric device. If there is an electric device, the current power rate level of which is equal to or higher than the DR control level, the controller 320 transmits a control signal to the communication unit 310 in such a manner that the power saving operation can be carried out in the corresponding electric device.

If the controller 320 receives a request for changing the DR control level to a desired DR control level from the user interface 330, the controller 320 stores the desired DR control level in the memory unit 340.

The controller 320 allows each electric device to display the currently established DR control level information. If the currently established DR control level is maintained, the expected electricity bill information can also be displayed on the user interface 330.

In more detail, the controller 320 can calculate the expected electricity bill using each electric device's average operation time information stored in the memory unit 340, the current power rate level information, and the current DR control level.

In addition, the controller 320 may also display the recommended DR level information on the user interface 330. In more detail, upon receiving priority information of the electric device installed in home and the current power rate level information, the controller 320 may provide suitable DR control level information for each electric device.

The priority information of several electric devices may be pre-established and stored in the memory unit 340. Alternatively, the priority information of several electric devices may be inputted by the user, such that the inputted priority information may be stored or changed.

The controller 320 controls a high-priority electric device to have higher DR control level information at which the power saving operation starts, as compared to a low-priority electric device, such that the power resources limited to the high-priority electric device can be centralized (utilized).

The controller 320 compares the current electric device information received from the communication unit 310 with the electric device information stored in the memory unit 340. As such, the controller 320 may delete the electric device information, that is stored in the memory unit but not contained in the current electric device information, from the memory unit 340 or may update the current electric device information.

Therefore, the memory unit 340 of the power management unit 300 according to the embodiment may periodically (or non-periodically or by a request by a user) update information regarding the electric device currently installed in each home.

The user interface 330 may be implemented as a display such as a liquid crystal display (LCD), and an input part and an output part of the user interface 330 may be integrated into one unit such as a touch panel. Alternatively, the user interface 330 may receive information from the user through 7 segments or a button, or the input part and the output part may be separated from each other in the user interface 330.

The user interface 330 displays the power rate level information, the DR control level information, etc., receives a request for changing the DR control level to a desired DR control level from the user, and displays the received information.

The user interface 330 displays a current power rate and a power rate level corresponding to the current power rate.

Figure 7A:
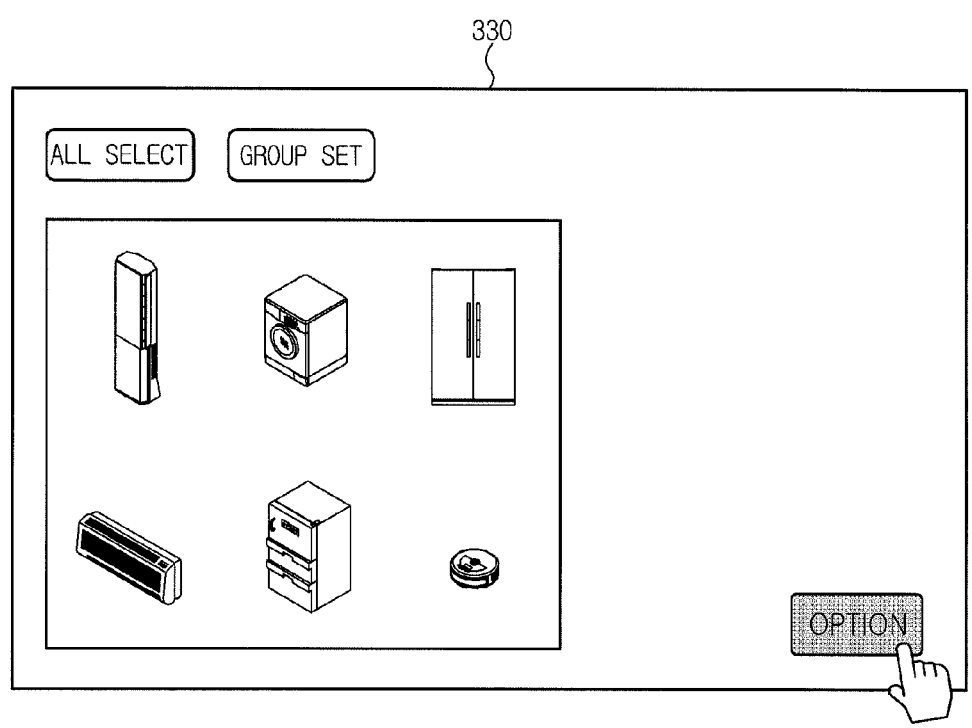
FIG. 7A shows a screen image of a user interface of a power management unit according to another embodiment.
Figure 7B:
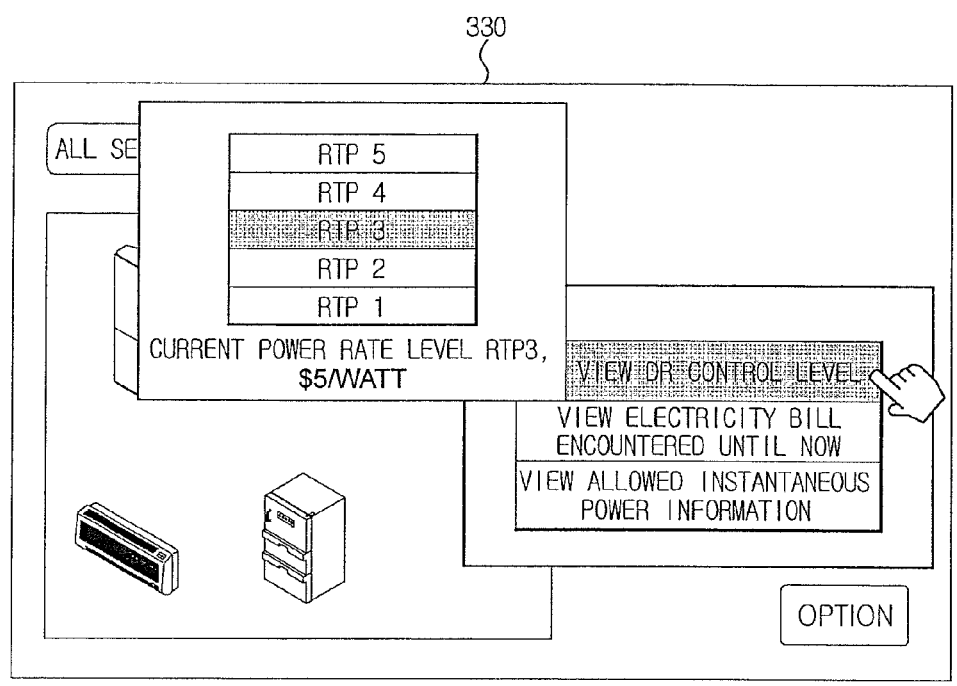
FIG. 7B shows a screen image of a user interface of a power management unit.

FIGS. 7A and 7B show exemplary screen images of the user interface of the power management unit according to an embodiment.

Referring to FIGS. 7A and 7B, the user interface 330 displays the current power rate and the power rate level information corresponding to the current power rate.

In this case, the power rate level information is classified into 5 levels (RTP1 to RTP5) according to power prices. As can be seen from FIG. 7B, the current power rate is 5 dollars per watt hour and this power rate corresponds to RTP3.

Meanwhile, although the embodiment of the disclosure exemplarily divides the power rate level information into 5 levels according to the power rates, the number of power rate levels may be changed according to the power providing policy of the utility company.

In addition, according to the embodiment of the disclosure, although the power rate levels are vertically arranged in ascending numerical order, it should be noted that the power rate levels may also be arranged in ascending numeral order in a horizontal or circular form. If necessary, the power rate levels may also be displayed in various ways representing high and low power rate levels without departing from the scope or spirit of the embodiment.

If the power rate level information displayed on the user interface 330 is confirmed as described above, the user selects an option menu such that the user can recognize a variety of current states, for example, the DR control level information, past power rate information, and allowed instantaneous power information of each home.

The user interface 330 may allow the user to change the DR control level information.

In more detail, the user interface 330 may provide information of a current DR control level where DR control for each electric device is started, and product recommended DR control level information pre-stored in the electric device when the product is manufactured, such that the DR control level can be changed on the basis of the received information.

In addition, if the current DR control level information and the current DR control level are maintained, the user interface 330 may provide the expected electricity bill information and the recommended DR control level information.

In addition, the recommended DR control level may be a DR control level in which priorities of several electric devices installed in a home are reflected, such that it can implement the power control in which only the utility of an electric device having relatively high priority is more considered. As a result, the limited power sources can be centralized (utilized) to the higher-priority electric device.

The appearance of the user interface 330 for confirming the power consumption status of individual electric devices will hereinafter be described with reference to FIGS. 8A and 8B.

Figure 8A:
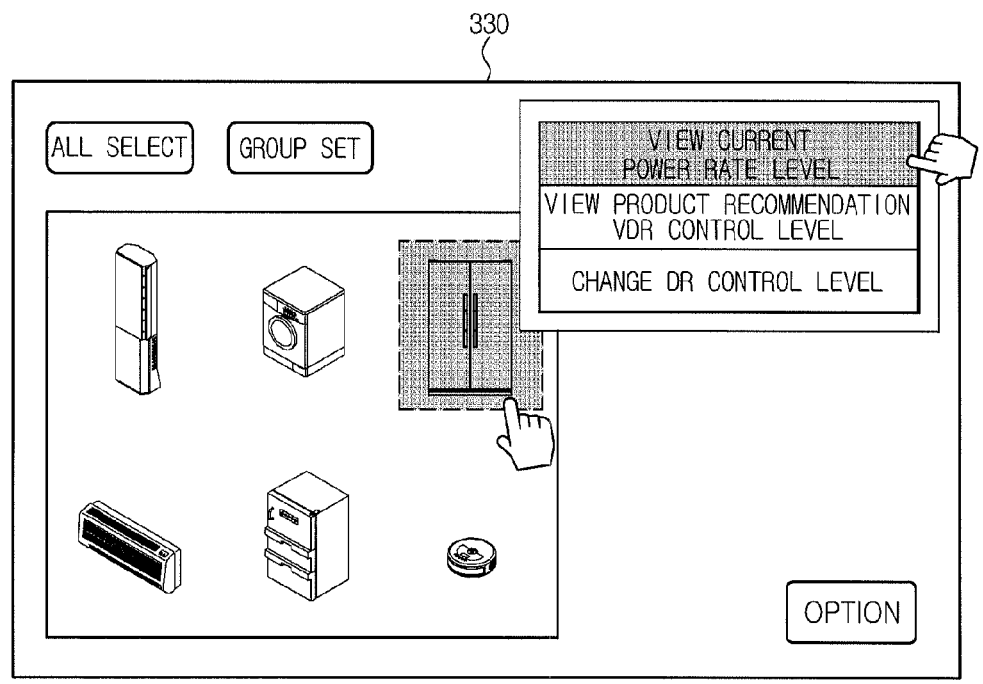
FIG. 8A shows a screen image of a user interface for controlling a DR control level.
Figure 8B:
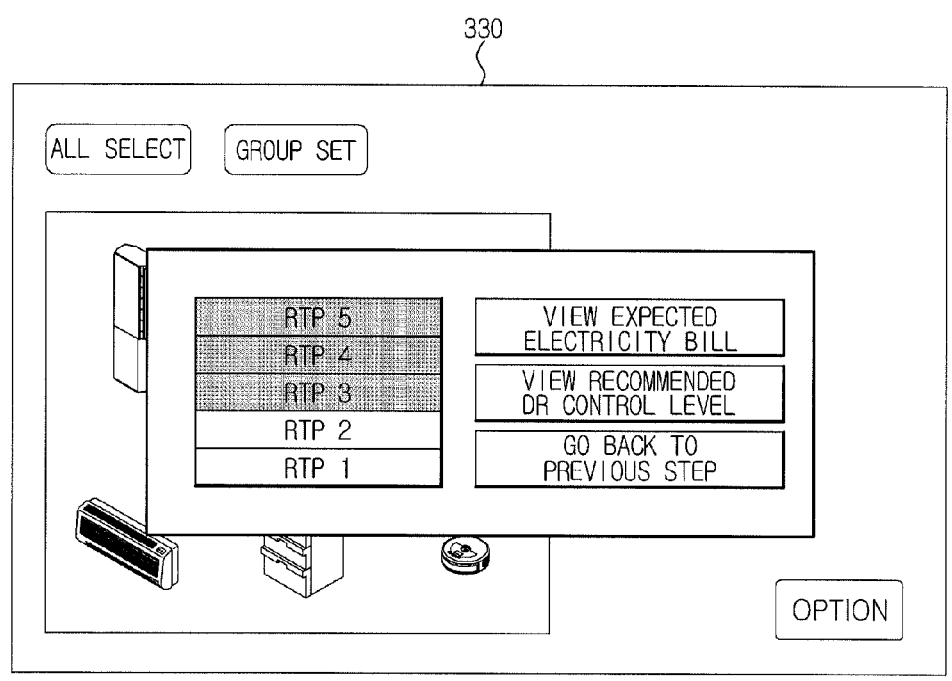
FIG. 8B shows a screen image of a user interface for controlling a DR control level.

Referring to FIGS. 8A and 8B, if a refrigerator is selected from among the list of electric devices installed in a home, a menu window is displayed. The menu window allows the user to view not only the DR control level information where the power saving operation of the refrigerator is started, but also the product recommended DR control level information indicating a predetermined DR control level assigned when the refrigerator is manufactured, and can also change the DR control level to a desired DR control level.

Upon receiving a menu for viewing the current DR control level from the user, a current DR control level, information regarding the electricity bill expected when the current control level is maintained, and recommended DR level information are displayed.

In more detail, the user can recognize that the current DR control level of the refrigerator is established in such a manner that the power saving control of the refrigerator can be started from the time corresponding to the power rate level RTP3. In addition, since the current power rate level is RTP3 (See FIG. 3), it can be recognized that the refrigerator is subjected to the power saving control.

The user interface 330 can change a DR control level according to individual electric devices, according to all the electric devices, or according to individual groups.

A method for changing the DR control level to a desired DR control level using the user interface will be given below with reference to FIGS. 9A and 9B.

Figure 9A:
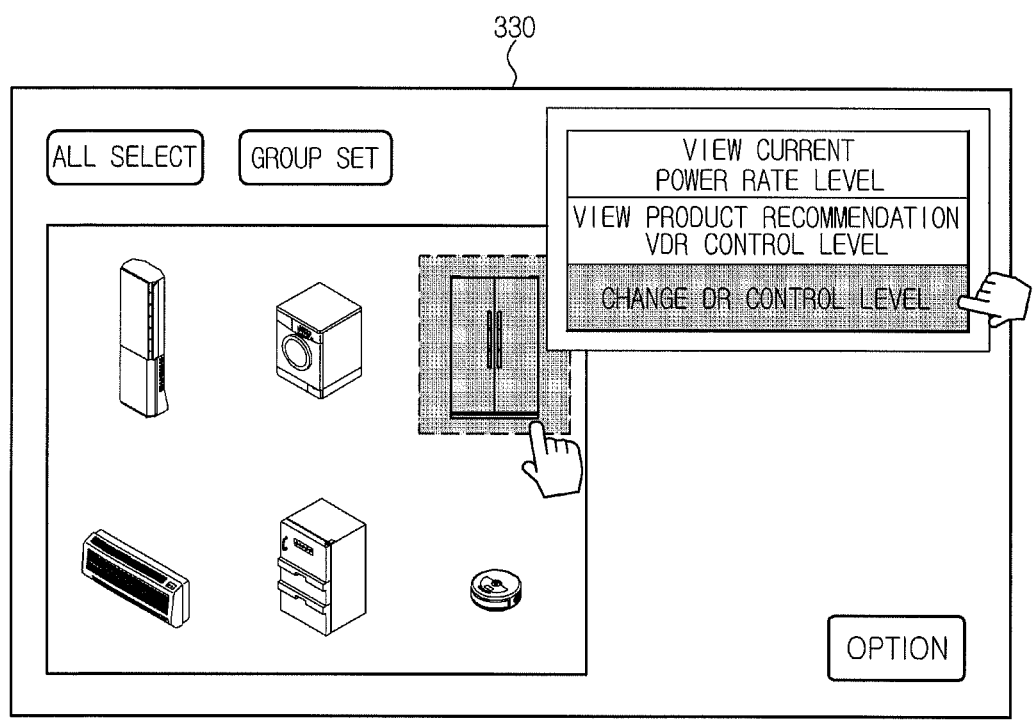
FIG. 9A illustrates a method for changing a DR control level for each electric device according to an embodiment.
Figure 9B:
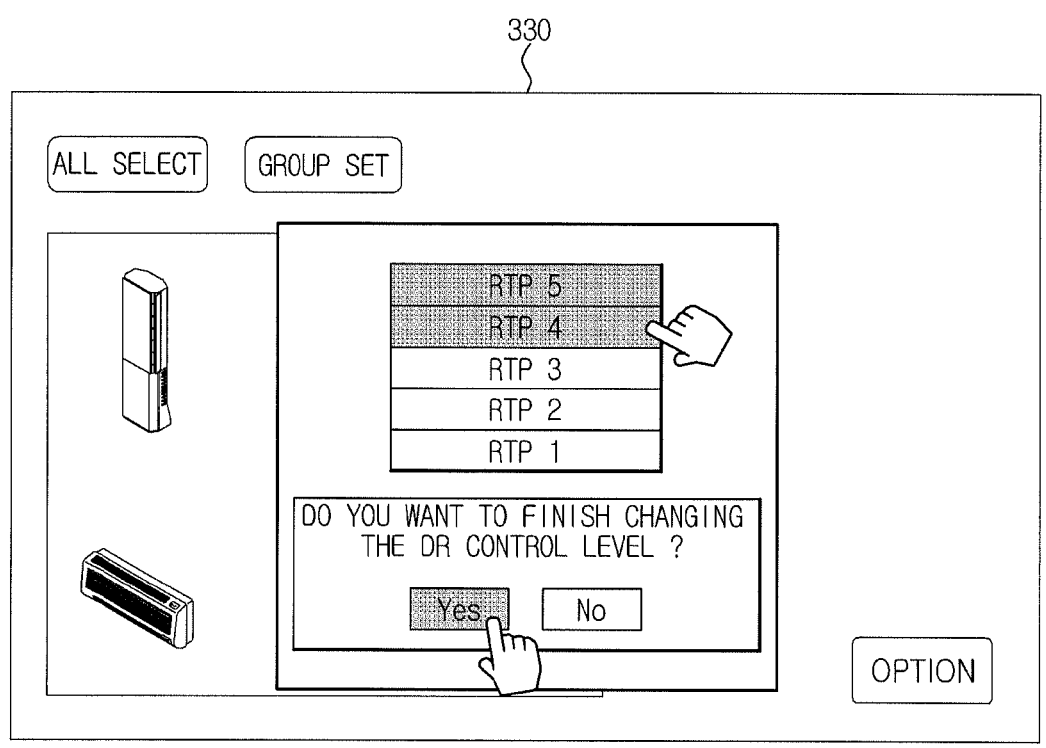
FIG. 9B illustrates a method for changing a DR control level for each electric device according to an embodiment.

FIGS. 9A and 9B illustrate a method for changing a DR control level for each electric device according to the embodiments.

If the user selects a refrigerator and inputs a command for changing a DR control level of the refrigerator to a desired DR control level, the user interface displays the list of changeable DR control levels.

In this case, the list of DR control levels may be the same or equal to the above-mentioned power rate level information, and may be changed according to the power providing policy of the utility company.

In addition, according to the embodiment, although the list of DR control levels is vertically arranged in ascending numerical order of power rate levels. Assuming that information regarding the high power rate level or the low power rate level can be provided to the user, the DR control level list may also be displayed in different ways. For example, the DR control level list may also be arranged in a horizontal or circular form without departing from the scope or spirit of the embodiment.

If the DR control level list is displayed, the user selects RTP4 (one step higher than a currently established DR control level), such that the user may further consider the utility or usage. In addition, the user may select a DR control level lower than the currently established DR control level in consideration of the power saving aspect.

If the DR control level is changed as described above, the power saving control is performed from a specific time where the current power rate level is equal to or higher than the DR control level.

Figure 10A:
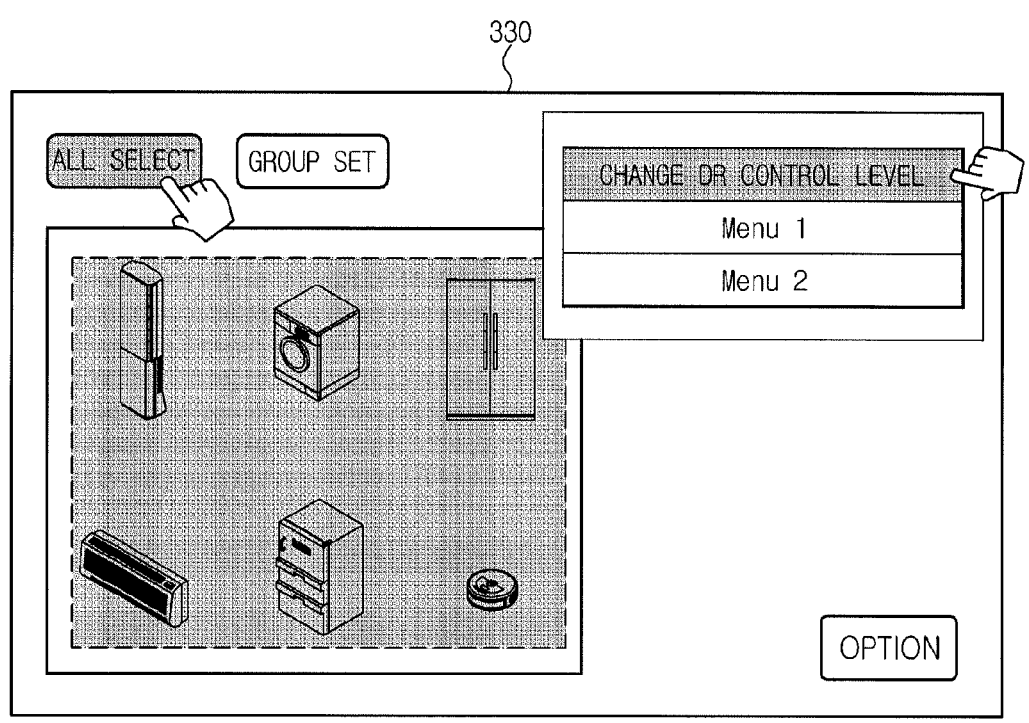
FIG. 10A illustrates a method for changing a DR control level for all the electric devices installed in each home.
Figure 10B:
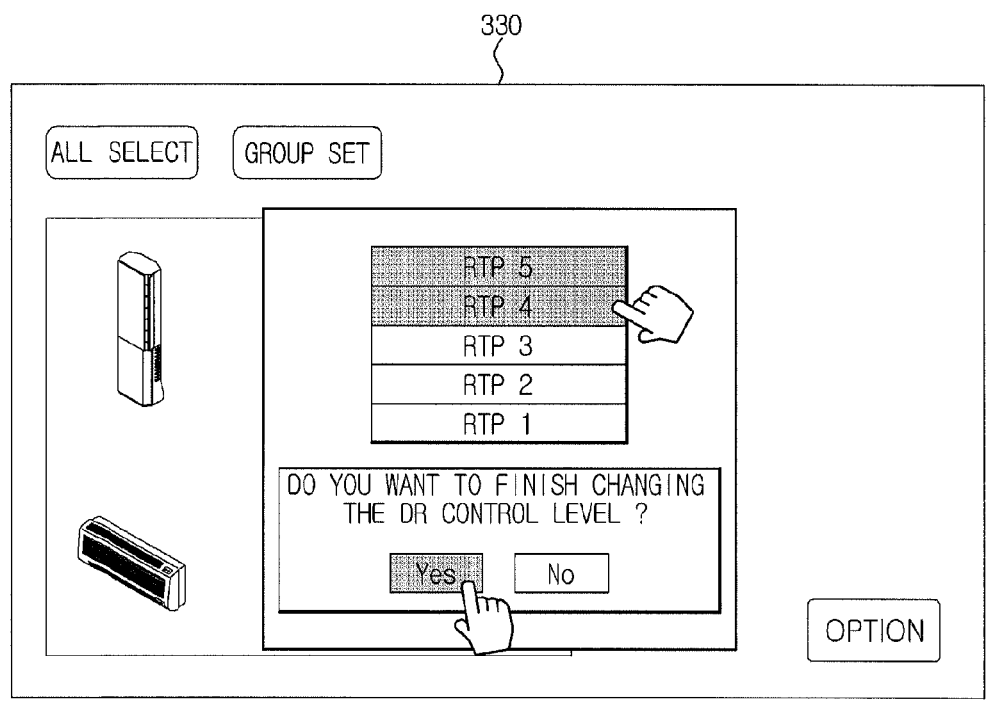
FIG. 10B illustrates a method for changing a DR control level for all the electric devices installed in each home.

FIGS. 10A and 10B are a conceptual diagram illustrating a method for changing a DR control level for all the electric devices installed in each home.

If the menu 'All Select' is inputted through the user interface, information indicating that all the electric devices installed in each home are the DR control level change targets is displayed.

If the menu of 'All Select' is selected, a desired DR control level from among the DR control level list is received, such that the user can simultaneously change the DR control levels of all the electric devices.

Figure 11A:
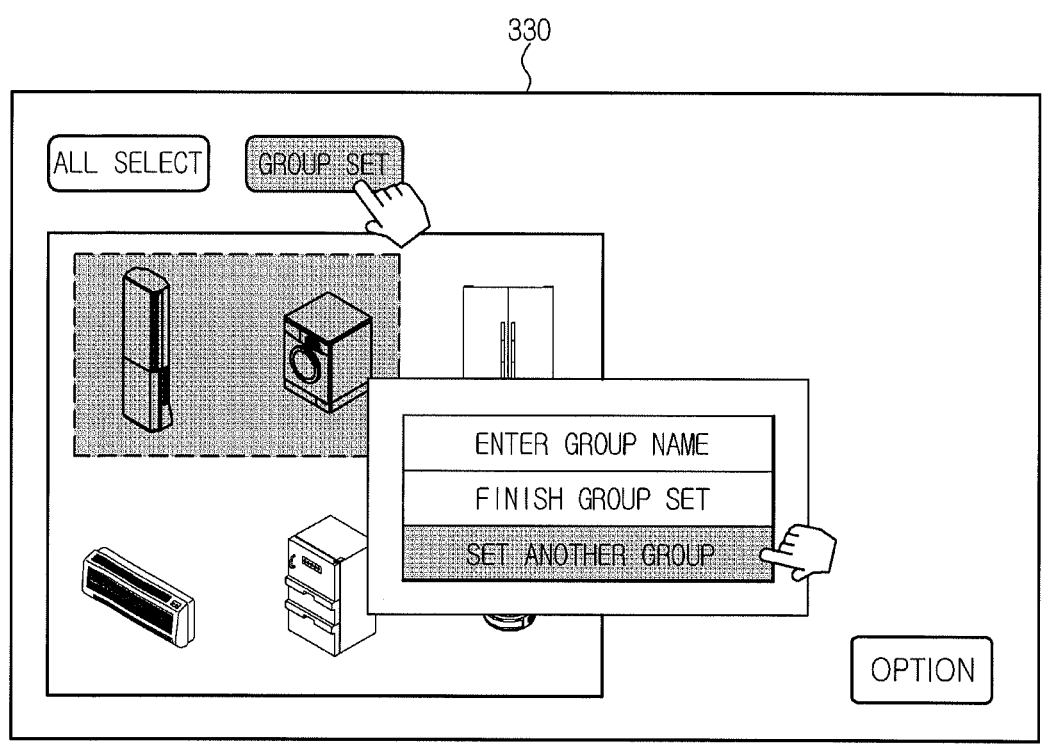
FIG. 11A illustrates a method for changing a DR control level by establishing a group from among all the electric devices according to an embodiment.
Figure 11B:
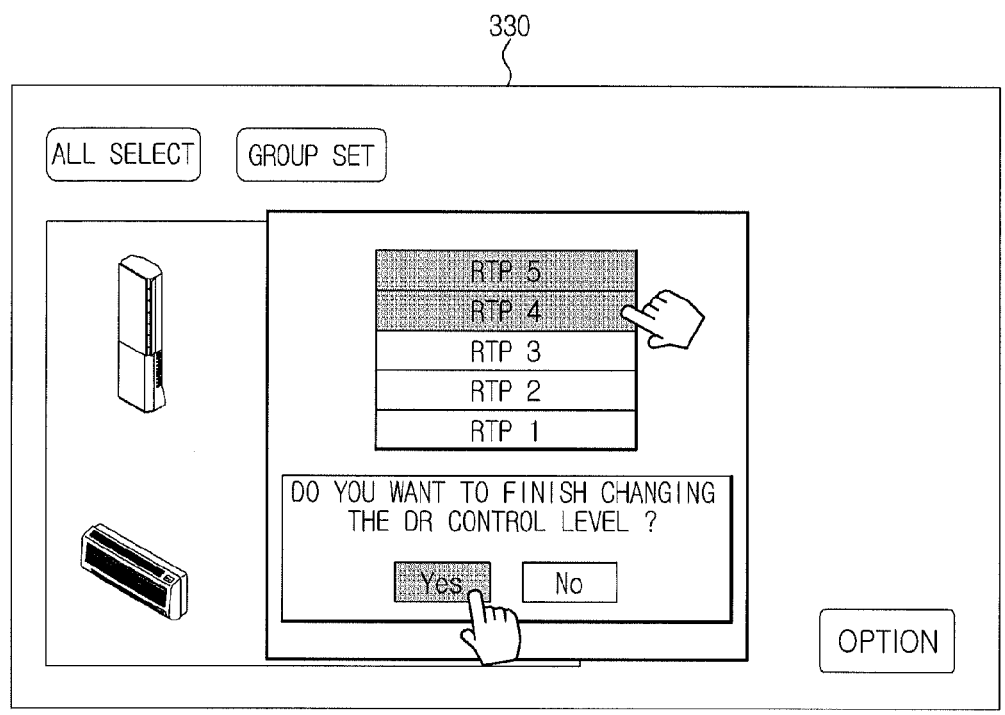
FIG. 11B illustrates a method for changing a DR control level by establishing a group from among all the electric devices according to an embodiment.

FIGS. 11A and 11B illustrates a method for changing a DR control level by establishing a group from among all the electric devices according to an embodiment.

If the menu 'Group Set' is inputted through the user interface, several electric devices having DR control levels to be changed to a desired DR control level can be selected according to individual groups.

In more detail, the user may set the group by dragging or selecting the electric device list one by one as necessary.

In addition, if at least one electric device is selected as one group, several groups may further be established through a menu 'Set Another Group'. For example, provided that the menu 'Group Set' is established, 'refrigerator' and 'washing machine' are selected, group name and group set completion messages are inputted, the group setting of the first group is completed. The user selects the menu 'Set Another Group' such that the user can establish other groups other than the pre-established group.

If several groups are established as described above, DR control levels for individual groups can be changed. As a result, the DR control level for each group is changed such that the user can conveniently change the DR control level without any difficulty.

Figure 12:
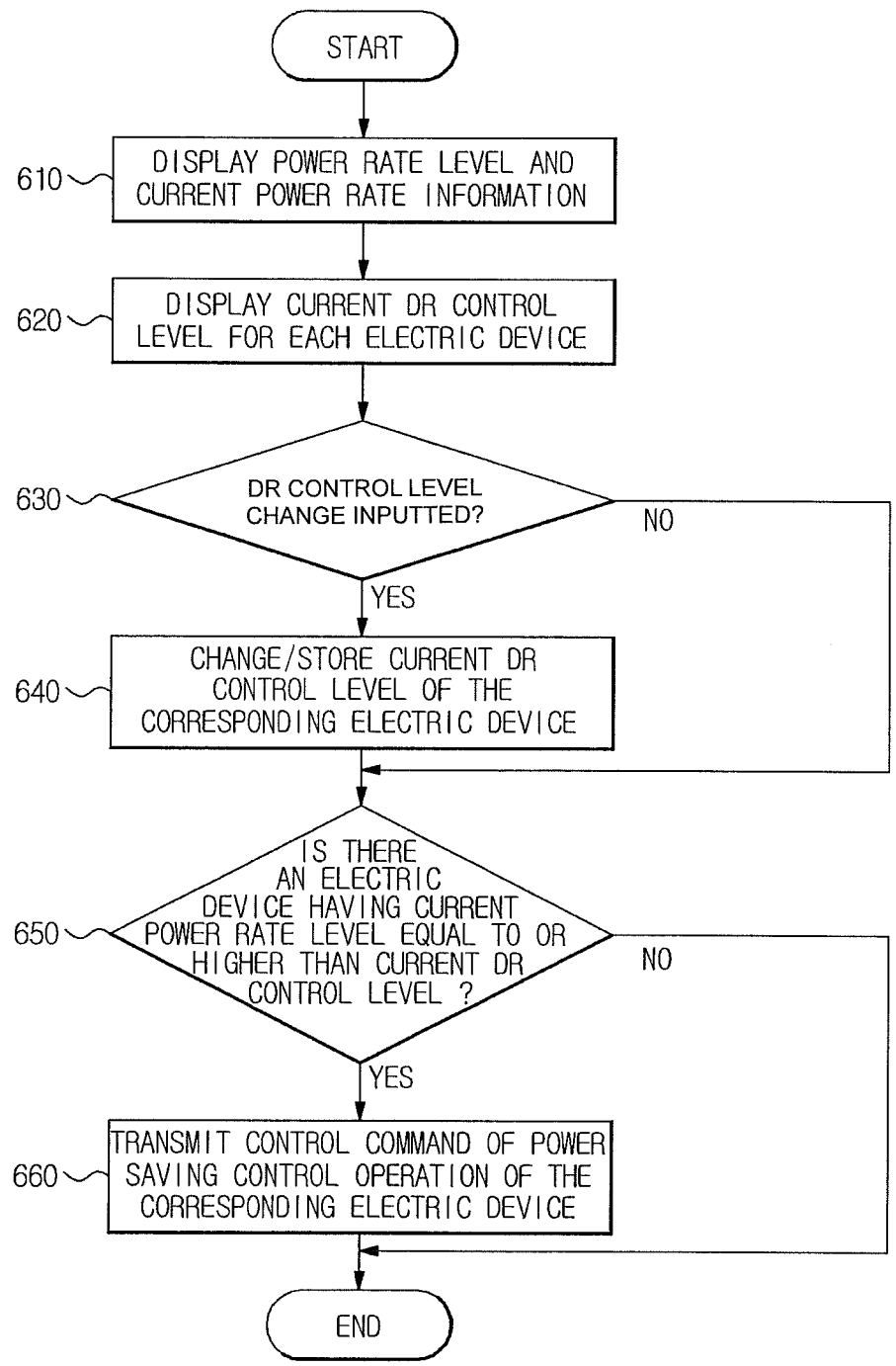
FIG. 12 illustrates a method for controlling a power management unit according to another embodiment.

FIG. 12 illustrates a method for controlling a power management unit according to another embodiment.

Referring to FIG. 12, the power management unit according to the embodiment displays current power rate information received from the communication unit and the power rate level information corresponding to the received power rate information through the user interface 330 (Operation 610).

In addition, the user interface 330 displays the currently established DR control level for each electric device and the product recommended DR control level information (Operation 620).

In addition, the user interface 330 may provide the current DR control level information, the expected electricity bill information encountered when the current DR control level information is maintained, and the recommended DR control level information in which priorities of several electric devices are reflected.

Based on the information provided to each electric device, the user may select a DR control level change menu through the user interface, and select a DR control level to be changed from among the window of the DR control level list, such that the current DR control level can be changed (Operation 630).

The above-mentioned DR control level change may be carried out for each electric device. In addition, a group is created such that the above-mentioned DR control level change operation may be carried out for each group. If necessary, all the electric devices may be controlled to have the same DR control level.

Upon receiving a request for changing the DR control level to a desired DR control level from the user (Operation 630), the controller 420 stores the desired DR control level and information regarding an electric device 400 corresponding to the desired DR control level in the memory unit 340 (Operation 640).

If the desired DR control level is stored (Operation 640), the controller 420 compares the current power rate level information periodically received from the communication unit with a DR control level for each electric device 400, such that it determines the presence or absence of an electric device to be power-saving controlled (Operation 650).

In more detail, the controller 420 determines the presence or absence of an electric device, a DR control level of which is equal to or higher than the currently established DR control level (the desired DR control level), transmits a control signal to the corresponding electric device, such that it controls the electric device 400 to be power-saving controlled (Operation 650).

The power management unit and a method for controlling the same according to the embodiments can allow the user to select a desired DR control level, such that a DR control level suitable for the variation of power rate level can be determined. Therefore, power can be effectively utilized according to individual power rate levels.

As is apparent from the above description, the electric device for changing a DR control level and a power management apparatus for controlling the same according to the embodiment can decide whether to increase the usage of the electric device or to consider the power saving aspect using current power status information transmitted in real time, thereby adaptively adjusting a start level of the DR control. Therefore, although the user desires to normally operate the electric device without the power saving control of the electric device, it is impossible for the user to normally operate the electric device.

In addition, the power management apparatus according to the present invention can increase a DR control level indicting a start level of DR control of the electric device which must be more focused on the utility rather than the power saving aspect such that limited power resources can be utilized according to user intention.

The embodiments can simultaneously scan current power consumption states and DR control level degrees of electric devices installed in a home. In addition, the embodiments can change a DR control level of each device, according to the electric devices, or according to individual groups, resulting in more efficient power control.

Meanwhile, embodiments can be written as computer programs and can be implemented in general-use digital computers that execute the programs using a computer readable recording medium. Also, the data structure used in the embodiments described above can be recorded on a computer readable recording medium via various means. Examples of the computer readable recording medium include magnetic storage media (e.g., ROM, floppy disks, hard disks, etc.), optical recording media (e.g., CD-ROMs, or DVDs), etc.

Although a few embodiments have been shown and described, it would be appreciated by those skilled in the art that changes may be made in these embodiments without departing from the principles and spirit of the embodiment, the scope of which is defined in the claims and their equivalents.

What is claimed is:

1. An electric device for changing a demand response (DR) control level, comprising:
    a processor, comprising:
    a memory unit to store one of a plurality of DR control levels each corresponding to a power rate level as a start level of the power saving operation;
    a communication unit to receive a current power rate and a current power rate level related to the current power rate from a power provider;
    a user interface which, upon receiving a request for changing a DR control level to a desired DR control level from a user, displays a list of the stored DR control levels and receives the desired DR control level from the user; and
    a controller to compare the current power rate level with the desired DR control level from the plurality of DR control levels, and to determine whether to perform a power saving operation,
    wherein the controller sets a product recommended DR control level pre-stored in the memory unit when the product is manufactured to the start level of the power saving operation, and sets the desired DR control level to the start level of the power saving operation upon receiving a request for changing the DR control level to the desired DR control level from the user interface.

2. The electric device according to claim 1, wherein the controller, if the current power rate level is equal to or higher than the desired DR control level, decides to perform the power saving operation.

3. The electric device according to claim 1, wherein the user interface displays a currently established DR control level for a predetermined period of time starting from when the electric device is powered on or requested by the user.

4. The electric device according to claim 3, wherein the user interface displays a menu for changing the DR control level, displays the DR control level list if the user selects a menu for changing the DR control level, and receives a DR control level to be changed from among the DR control level list from the user.

5. The electric device according to claim 1, wherein the product recommended DR control level information is received through the communication unit.

6. The electric device according to claim 5, wherein the user interface displays the current power rate level received from the communication unit and the product recommended DR control level, and provides the user with information of the electric device.

7. A power management apparatus for changing a demand response (DR) control level, comprising:
    a processor, comprising:
    a communication unit to receive a current power rate and a current power rate level related to the current power rate;
    a memory unit to store the received current power rate, the received current power rate level and, a plurality of DR control levels each corresponding to a power rate level and information of a plurality of electric devices;
    a user interface which, upon receiving a request for changing a DR control level of at least one electric device from a user, receives a desired DR control level from the user; and
    a controller to compare the current power rate level with the desired DR control level, and determine whether to perform a power saving operation to the electric device,
    wherein the information of the plurality of electric device each includes a start level of the power saving operation; and
    wherein the controller sets a product recommended DR control level pre-stored in the memory unit when the product is manufactured to a start level of the power saving operation, and sets the desired DR control level to a start level of the power saving operation upon receiving a request for changing the DR control level to the desired DR control level from the user interface.

8. The power management apparatus according to claim 7, wherein the user interface receives a request for changing the DR control level to the desired DR control level for each electric device, and receives a request for changing a DR control level to the desired DR control level of each of the electric devices.

9. The power management apparatus according to claim 8, wherein the user interface, if the DR control level for each electric device is changed, displays a list of electric devices installed in a home, allows the user to select an electric device having the desired DR control level from among the displayed list of electric devices, displays the DR control level list of the selected electric device and receives information regarding the desired DR control level from the user.

10. The power management apparatus according to claim 9, wherein the user interface, if the user selects the electric device, displays the corresponding electric device information received through the communication unit.

11. The power management apparatus according to claim 10, wherein the electric device information includes at least any one of DR control level information currently established in the corresponding electric device and product recommended DR control level information pre-stored when the corresponding electric device is manufactured.

12. The power management apparatus according to claim 8, wherein the user interface receives information regarding the DR control level change in association with a plurality of electric devices installed in home, and receives a request for changing the DR control level to a desired DR control level in association with at least one group including at least one electric device from among the plurality of electric devices.

13. The power management apparatus according to claim 7, wherein the controller determines whether there is an electric device, a currently established DR control level of which is equal to or less than the current power rate level, and controls the corresponding electric device to perform the power saving operation.

14. The power management apparatus according to claim 7, wherein the memory unit configures the list of electric devices on the basis of information received from the plurality of electric devices, and stores the configured electric device list, and stores electric device information corresponding to the list of electric devices.

15. The power management apparatus according to claim 14, wherein the communication unit periodically receives information regarding several electric devices installed in a home.

16. The power management apparatus according to claim 15, wherein the controller updates the electric device list.

17. The power management apparatus according to claim 16, wherein the controller compares the pre-stored electric device list with the periodically received electric device information, and updates the electric device list according to the result of comparison.

18. A method of controlling electric devices, comprising:
storing a plurality of demand response (DR) control levels of electric devices classified according to power rates;
receiving a current power rate level related to a current power rate from a power provider;
comparing, by a processor, the current power rate level with a desired DR control level selected by a user from the plurality of DR control levels;
performing power saving operation to at least one of electric devices based upon the comparison,
wherein a start level of the power saving operation is one of a plurality of DR control levels each corresponding to a power rate level; and
setting, by the processor, a product recommended DR control level pre-stored in a memory unit when the product is manufactured to the start level of the power saving operation, and setting the desired DR control level to the start level of the power saving operation upon receiving a request for changing the DR control level to the desired DR control level from the user interface.

* * * * *